March 29, 1955    J. S. HICKS    2,705,080
APPARATUS FOR GRAVITATING GRANULAR SOLIDS
BETWEEN ZONES OF DIFFERENT PRESSURE
Filed July 16, 1952                                   2 Sheets-Sheet 1

INVENTOR
John S. Hicks
BY
Charles C. Huggett
ATTORNEY

March 29, 1955 J. S. HICKS 2,705,080
APPARATUS FOR GRAVITATING GRANULAR SOLIDS
BETWEEN ZONES OF DIFFERENT PRESSURE
Filed July 16, 1952 2 Sheets-Sheet 2

INVENTOR
John S. Hicks
BY
Charles G. Huggett
ATTORNEY

United States Patent Office 2,705,080
Patented Mar. 29, 1955

2,705,080

APPARATUS FOR GRAVITATING GRANULAR SOLIDS BETWEEN ZONES OF DIFFERENT PRESSURE

John S. Hicks, Wenonah, N. J., assignor to Socony-Vacuum Oil Company, Incorporated, a corporation of New York Application July 16, 1952, Serial No. 299,138

2 Claims. (Cl. 214—17)

This invention relates to hydrocarbon conversion processes in which granular solid material is gravitated from a zone at one pressure to a zone at a different pressure. It is particularly directed to an improvement in continuous conversion processes in which the granular material is gravitated through reaction and reconditioning zones in an enclosed continuous cyclic path.

Many processes, such as hydroforming, coking, visbreaking, reforming and cracking, utilize moving masses of granular contact material to effect chemical transformations of hydrocarbons. The granular material is gravitated in substantially compact columnar form through reaction and reconditioning zones and lifted from the bottom of one zone to the top of the other zone to complete an enclosed cyclic path. Reactant hydrocarbons, suitably prepared for conversion, are introduced into the bed of contact material in the reaction zone and withdrawn from the other side of the bed. The temperature in the reaction zone is usually about 900–1100° F. and the pressure is usually advanced. The most suitable pressure and temperature conditions will depend to some extent upon the process; a suitable pressure for cracking may be about 15 p. s. i. (gauge) whereas for reforming, much higher pressures have been utilized, viz. 200–300 p. s. i. (gauge). During reaction, a carbonaceous contaminant is deposited on the granular contact material. This is removed by burning in the reconditioning zone. Air is passed through the bed of solids and flue gas removed from the other side of the bed. The temperature in the kiln is usually maintained at about 1000–1300° F. and the pressure is usually maintained at approximately atmospheric pressure. In particular instances, however, other temperatures and pressures are found more suitable.

The granular material may be a natural or treated clay or a synthetic association of silica, silica-alumina, silica-chromia or the like. It may be catalytic in nature or inert, depending upon the process. When inerts are used, the particles are used primarily as a heat carrying medium, to transfer heat from the kiln to the reactor. The size range for cracking may be about 3–60 mesh or more suitably 4–15 mesh. For other processes, other sizes may be more suitable but in any event the size should be at least large enough to provide adequate void space between the particles in the bed for the transfer therethrough of the gas. Although both regular and irregular-shaped particles can be used, regular shapes, such as pills, pellets or spheres are preferred.

When the granular particles are broken in these processes, fine particles are produced called "fines." The fines tend to classify or gather together in various locations in the system producing undesirable results. For example, they locate in the void spaces in portions of the beds preventing gas transfer through that portion of the bed. The fines necessitate a higher pressure across the bed to effect transfer of the gas therethrough. It is, therefore, desirable to avoid particle breakage in order to keep the fines concentration in moving bed conversion systems down to a minimum level.

Valves have been used in the feed and withdrawal conduits to the reaction and reconditioning zones to prevent the transfer of gas from one zone to the other. Inasmuch as these valves must operate through the catalyst column, they have proved undesirable in the past. The moving valve plate causes catalyst breakage, and the particles tend to jam or pack in recesses of the valve, causing malfunctioning of the valve. In processes which operate at low reaction pressure, valves have been avoided by using seal legs long enough to inhibit the transfer there through of gas in conjunction with an inert seal gas introduced into the seal leg at a pressure slightly higher than the pressure in the reaction zone, so as to confine the reactants to the reaction zone. In various processes, such as high pressure cracking and reforming, this is not practicable because of the exceedingly long seal legs required, and hence valves have been used with the consequent difficulties.

This invention is directed to an improved apparatus for gravitating a granular contact material from a zone at one pressure to a zone at a substantially different pressure.

A further object of this invention is to provide an improved apparatus for introducing a granular contact material into a high pressure reaction zone.

These and other objects will be made more apparent in the following detailed description of the invention which is to be read in conjunction with the attached drawings.

In one aspect of the invention, the granular material is gravitated into a vessel which is rotated about a horizontal axis in or near one end of the vessel. The entrance and exit to the vessel are located at the same level as the axis of the vessel in the form of spring-loaded sleeve connections. When the end of the vessel furthermost from the axis is below the axis, solids are gravitated into the vessel. When this end rises above the axis, the solids are discharged from the vessel through a discharge conduit into a vessel having greater volumetric capacity than the rotating vessel. After the flow to the second vessel is completed, a valve at the top of the vessel is closed and the pressure in the vessel is changed to substantially the pressure in the reaction vessel. The valve in a conduit between the second vessel and the reaction vessel is then opened allowing the solids to gravitate from the second vessel into the reaction vessel. By this procedure the valves are always closed upon empty conduits and the crushing of the catalyst usually encountered in these systems is avoided.

Figure 1:
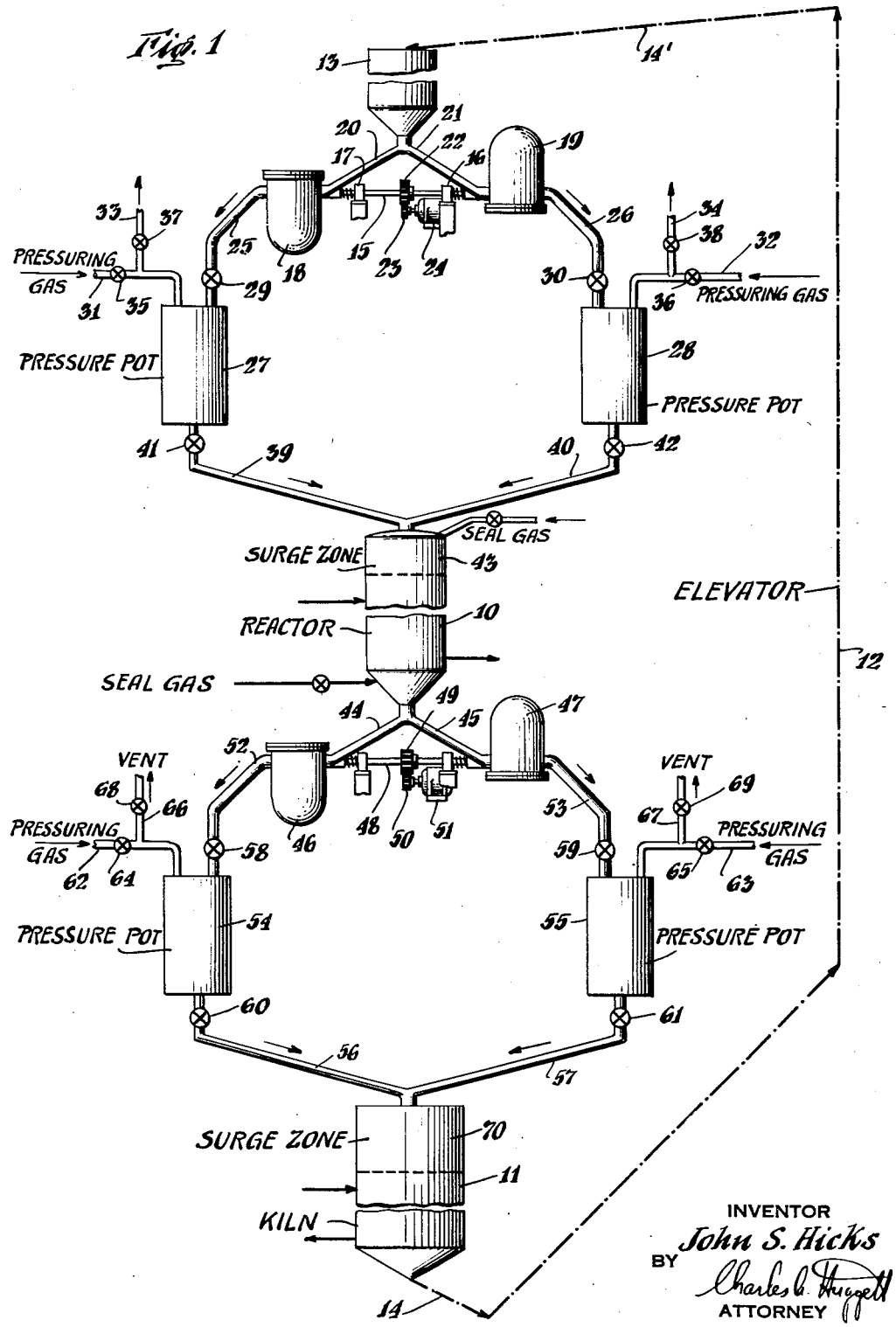
Figure 1 is a showing of a continuous moving bed reforming system.

Referring to Figure 1, a reaction 10 is superposed a kiln 11, and an elevator 12 is located adjacent to the superposed reactor-kiln combination. A hopper 13 is located above the reactor 10 and connected to the top of the elevator via the conduit 14′. The bottom of the kiln 11 is connected to the bottom of the elevator via the conduit 14. A shaft 15 is horizontally mounted at an elevation between that of the hopper 13 and reactor 10, on bearings 16, 17. Revolving feed pots 18, 19 are mounted on the shaft 15. The shaft 15 connects to the vessels 18, 19 at one end thereof, so that when the bottom end of vessel 18 is up, the opposite end of vessel 19 is down, as indicated on the figure. Conduits 20, 21 connect with the hopper 13 and the pots 18, 19. The lower end of the conduits connects to the rotating vessels 18, 19 by a sliding sleeve connection, so as to communicate with the feed pot interior through an annular aperture about the axis of the shaft 15. The shaft 15 is rotated by means of gears 22, 23, powered by the motor 24. The conduits 25, 26 are attached at their upper ends to the vessels 18, 19 by sliding sleeve connections at a location in alignment with the axis of the shaft 15 and at their lower ends to the top of the pressure pots 27, 28. Valves 29, 30 are provided in the conduits 25, 26.

Pressure lines 31, 32 are attached to the pressure pots 27, 28 and vent lines 33, 34 are attached to said pots. Valves 35, 36, 37 and 38 are provided in said lines. The drain conduits 39, 40 are attached to the bottom of said vessels and communicate with the top of the reactor 10. Valves 41, 42 are provided in said drain conduits. A surge chamber 43 is provided in the upper portion of said reactor 10. The conduits 44, 45 connect the bottom of the reactor 10 with the revolving feed pots 46, 47. The shaft 48 is rotated similar to shaft 15 described above by means of gears 49, 50 and the motor 51. The operation of the revolving vessels 46, 47 is similar to that of vessels 18, 19 and serves to intermittently move contact material through the conduits 52, 53 into the vessels 54, 55. The drain conduits 56, 57 are connected between the bottoms of these vessels and the top of the kiln 11. Valves 58, 59, 60 and 61 are provided in the conduits above and below the vessels 54, 55. Pressure lines 62, 63 are attached to the vessels 54, 55, being provided with valves 64, 65. Vent lines 66, 67 are attached to the vessels 54, 55, being provided with valves 68, 69. A surge zone 70 is provided in the upper portion of said kiln 11.

In operation, the contact material is supplied to the hopper 13 and gravitated continuously into one or the other of the revolving feed pots 18, 19, depending upon which pot is in the down position. The volume of the vessels 27, 28 is made larger than that of the revolving pots 18, 19. Therefore, when the full pot revolves, the contents of the pot are discharged through the connecting conduit into the vessel 27 or 28 and does not fill this vessel. The valves 41, 42 are in the closed position when the vesesl is being filled and after the flow into the vessel has ceased, the valve 29 or 30 is closed. Since the conduits 25, and 26 are empty when the valves 29 or 30 are closed, no damage to the valves or catalyst occurs. The valves above and below the vessels 27, 28 are automatically controlled by a cycle timer, not shown, so that when vessel 27 is being filled, vessel 28 is being emptied, and vice versa. After a supply of catalyst has been delivered to one of the vessels, for example, vessel 28, the valve 30 automatically closes and the valve 36 in the pressure line 32 opens to admit gas under pressure to the vessel 28. The valve 38 in vent line 34 is closed at this time, to permit the pressure in the vessel 28 to rise to about the pressure maintained in the reactor 10. Valve 42 automatically opens when the pressure is up and the solids gravitate through the conduit 40 into the top section of the reactor, which is a surge chamber having a volumetric capacity greater than either vessel 27 or 28. After the vessel 28 is emptied, the valve 42 is closed and the valve 36 is closed in the pressuring line 32. The valve 38 in the vent line 34 is opened allowing the pressure in the vessel 28 to drop to atmospheric and the valve 30 in the conduit 26 is opened to permit a new charge of catalyst to be gravitated from the revolving vessel 19. The vessels 27 and 28 feed catalyst alternately to the surge chamber 43 in the reactor 10, keeping the reactor filled at all times with a gravitating bed of contact material.

The same procedure is followed in withdrawing solids from the reactor for transfer to the kiln, with the exception that the pressure is reduced from a high reactor pressure to substantially atmospheric pressure in the vessels 54, 55. It is seen that the valves 58, 59, 60 and 61 all close when the conduit is empty and hence the catalyst and valve breakage is avoided. The catalyst at reduced pressure is fed in slugs alternately from the vessels 54, 55 into the surge chamber 70 to maintain a supply of catalyst there at all times. The solids are removed from the bottom of the kiln 11 and conveyed upwardly through the elevator 12 to the hopper 13 to complete the enclosed path.

Figure 2:
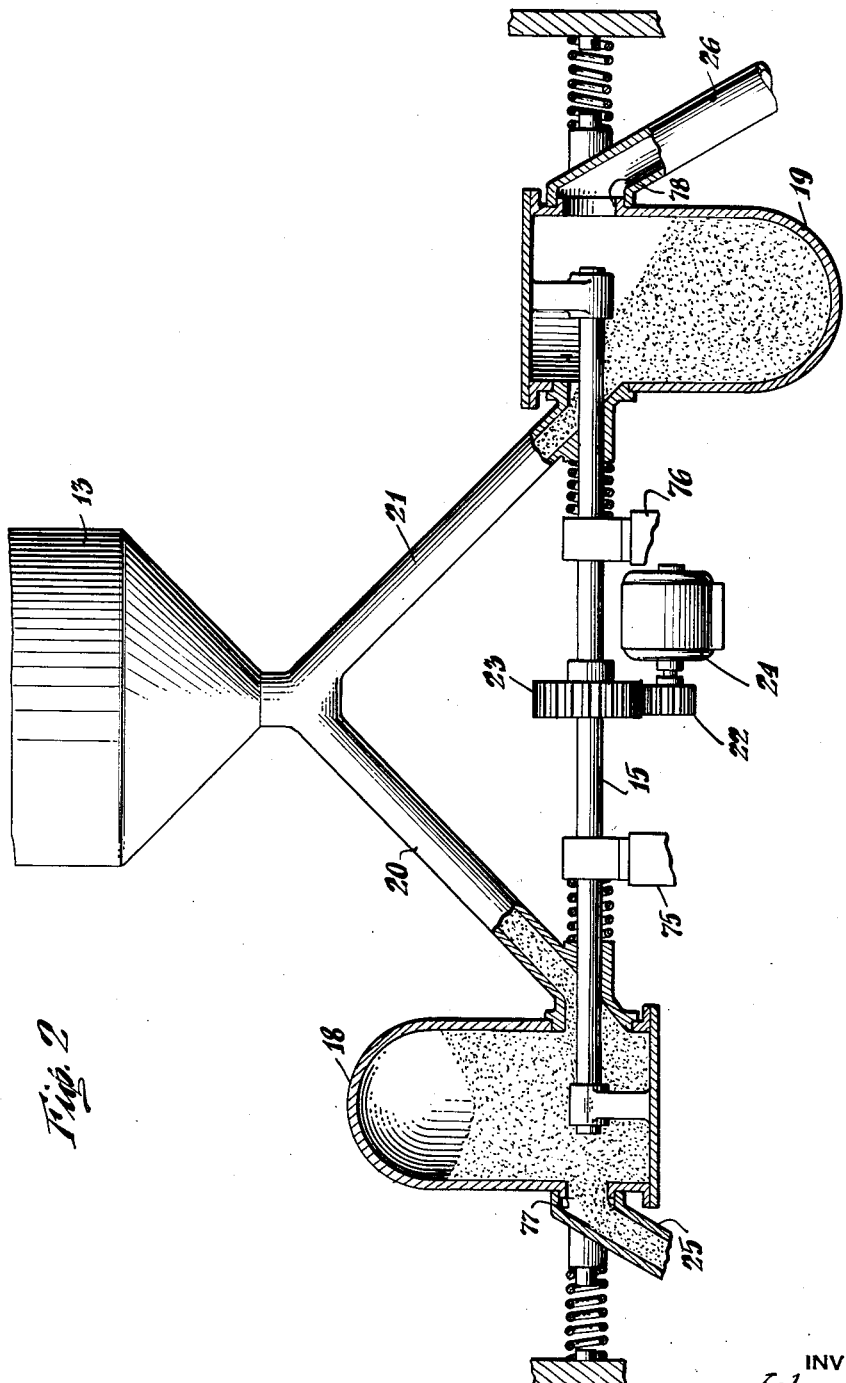
Figure 2 is an enlarged view of the apparatus used to transfer the solid material from the reactor to the kiln or vice versa.

Referring now to Figure 2, an enlarged sectional view of the revolving pots and drive mechanism is shown. The pots 18, 19 are attached to the ends of the revolving shaft 15. The shaft 15 is suitably supported by bearings, such as bearings 75, 76. The shaft 15 is driven continuously by the motor 24 via the mating gears 22, 23. The lower ends of the conduts 20, 21 are projected into the pots 18, 19 about the shaft 15. Similarly, the pots 18, 19 have a discharge outlet 77, 78, which projects into the conduits 25, 26. The conduits 20, 21, 25 and 26 are spring biased against the pots to make a fairly tight seal.

It will be understood that the invention is not intended to be restricted to the specific examples of structure, or operation given hereinabove, and it is intended to cover all changes and modifications of the examples of the invention herein chosen for purposes of disclosure which do not constitute departures from the spirit and scope of the invention.

I claim:

1. In an apparatus for transferring granular contact material from a first contacting vessel at one pressure through a surge chamber to a second contacting vessel at a substantially different pressure, the improvement comprising in combination: a revolving pot mounted for rotation about a horizontal axis through one end thereof, means for gravitating contact material from said first contacting vessel into said pot when the pot is in the down position, a first conduit associated with said revolving pot when the pot is rotated to the up position, a pressuring chamber attached to the bottom of said first conduit, a valve in said first conduit, said pressuring chamber having a larger volume than said revolving pot, means for placing said pressuring chamber under the same pressure as said second contacting vessel, a second conduit connected beneath said pressuring chamber through which said granular contact material passes to said surge chamber and then to said second contacting vessel, a valve in said second conduit and means for changing the pressure in said pressuring chamber from the pressure of said second contacting vessel to the pressure of said first contacting vessel.

2. In an apparatus for transferring granular contact material at one pressure through a surge chamber to a second contacting vessel at a substantially different pressure, the improvement comprising in combination: a first revolving pot mounted for rotation about a horizontal axis through one end thereof, a second revolving pot mounted for rotation about a horizontal axis through one end thereof, the second pot being mounted in the up position when said first pot is in the down position, means for gravitating contact material from said first contacting vessel into said first pot when said first pot is in the down position, means associated with said second pot for gravitating contact material from said first contacting vessel into said second pot when said second pot is in the down position, a first withdrawal conduit associated with said first pot, for gravitating contact material out of said first pot when said first pot is in the up position, a second withdrawal conduit associated with said second pot, for gravitating contact material out of said second pot when said second pot is in the up position, a first pressuring chamber attached to the lower end of said first withdrawal conduit, means for pressuring said chamber and means for venting said chamber, a second pressuring chamber attached to the lower end of said second withdrawal conduit, means for pressuring said second chamber and means for venting said chamber, a valve in said first withdrawal conduit, a valve in said second withdrawal conduit, a first conduit means located at the bottom of said first pressuring chamber through which said granular contact material passes to said surge chamber and then to said second contacting vessel, a valve in said first conduit means, a second conduit means located at the bottom of said second pressuring chamber through which said granular contact material passes to said surge chamber and then to said second contacting vessel and a valve in said second conduit means.

References Cited in the file of this patent

UNITED STATES PATENTS

| | | |
|---|---|---|
| 2,377,512 | Page, Jr. | June 5, 1945 |
| 2,585,472 | Kennedy | Feb. 12, 1952 |